United States Patent [19]

Auinger

[11] 4,341,970

[45] Jul. 27, 1982

[54] THREE PHASE WINDING FOR HIGH VOLTAGE MACHINES WITH Y-CONNECTED PHASES

[75] Inventor: Herbert Auinger, Nürnberg, Fed. Rep. of Germany

[73] Assignee: Siemens Aktiengesellschaft, Munich, Fed. Rep. of Germany

[21] Appl. No.: 69,990

[22] Filed: Aug. 27, 1979

[30] Foreign Application Priority Data

Sep. 22, 1978 [DE] Fed. Rep. of Germany ....... 2841415

[51] Int. Cl.$^3$ ............................................. H02K 3/00
[52] U.S. Cl. .................................. 310/184; 310/198; 318/773
[58] Field of Search ................ 310/180, 184, 198–208, 310/267; 318/772, 773, 776; 322/90

[56] References Cited

U.S. PATENT DOCUMENTS

| 3,175,142 | 3/1965 | Rawcliffe | 318/773 R |
| 3,432,707 | 3/1969 | Peters | 310/208 |
| 3,673,477 | 6/1972 | Broadway | 318/773 R |
| 3,809,937 | 5/1974 | Koike | 310/205 |
| 4,132,914 | 1/1979 | Khutoretsky | 310/205 |
| 4,138,619 | 2/1979 | Broadway | 310/198 |

Primary Examiner—R. Skudy
Attorney, Agent, or Firm—Kenyon & Kenyon

[57] ABSTRACT

A three phase winding for a high voltage machine with Y connected legs, whose coil groups, disposed on the circumference so as to be cyclically distributed, consist of series connected coils alternatingly energized in the opposite sense, has its size and copper requirements reduced by providing as many coil groups with the same direction of the magnetic flux and direction of increase in potential as there are coil groups of opposite direction of the magnetic flux and direction of increase in potential with the groups so distributed over the circumference and interconnected lengthwise that, at most, the phase voltage is applied to the phase transitions between adjacent coil sides.

13 Claims, 18 Drawing Figures

2p=4
a=2

2p=4
a=2

2p=6
a=1

THREE PHASE WINDING FOR HIGH VOLTAGE MACHINES WITH Y-CONNECTED PHASES

BACKGROUND OF THE INVENTION

This invention relates to three phase windings for high voltage machines with Y-connected phases generally, and more particularly to an improved winding arrangement for a machine of this nature which has coil groups disposed along the circumference cyclically distributed, each consisting of several series connected coils, the magnetic flux of which points alternatingly in opposite directions.

In the conventional three phase, high voltage windings with coil groups connected in series and/or in parallel within each phase the individual coil groups are always series connected in the same manner so that the direction of the magnetic flux through all coil groups is either the same as the direction of increase in potential or opposite to it. The number of coils in a coil group is $$q = \frac{N}{2p \times m},$$

N being the number of slots, m the number of phases and 2p the number of poles.

In such windings, when the coil groups are series connected, the maximum voltage at the phase alternation has the lowest value of $0.76 \times U_N$ ($U_N$=supply voltage) at 2p=2, which increases with an increasing number of poles to 0.88 $U_N$ at 2p=4; 0.92 $U_N$ at 2p=6; 0.94 $U_N$ at 2p=8 to almost $U_N$ for high numbers of poles. Such high voltages always occur in parallel connected coil groups. To manage this voltage stress occurring in the coil head between adjacent coil legs at the phase transition, considerably greater minimum leg spacings are required in view of the corona set-in voltage than would be necessary for production of ventilation reasons. This increases the coil length, the copper weight and the space requirement of the windings.

SUMMARY OF THE INVENTION

It is an object of the present invention to provide, without extra cost for the production of the coil groups and for circuitry, a three phase winding of the type described above in which the voltage stress at the phase transitions is significantly reduced regardless of the type of coil group connection within the phases, i.e., series and/or parallel connection with winding branches either distributed symmetrically over the circumference (unstable parallel connection) or concentrated in individual peripheral zones (indifferent parallel connection), and regardless of the number of poles, where the maximum phase voltage is to be at most $U_{Ph}=U_N/\sqrt{3}=0.58\ U_N$, so that the leg spacings can be reduced and the coil head overhang, the coil length and the copper requirements reduced accordingly.

In a three phase winding for high voltage machines with Y-connected phases of the general type described above, this object is accomplished by disposing the coil groups such that the magnetic flux direction in one-half of the coil groups is the same as the direction of the increase in potential. These forming "with" coil groups. The magnetic flux direction in the other half of the coil groups is opposed to the direction of the increase in potential. These forming "counter" coil groups. The "with" and "counter" coil groups of the various phases are so distributed over the circumference and so interconnected phase wise, that, at most, the phase voltage is present at the phase transition between adjacent coil sides.

The individual coil groups need not absolutely have the same number of coils, but in fractional slot windings or other windings with different zone belts for normal machines, in particular asynchronous squirrel cage motors, for instance, it is of advantage for these "with" and "counter" coil groups to have an identical number q of coils, which follows in the usual manner from the number of slots N, the number of phases m and the number of poles 2p according to the relation $$q = \frac{N}{2p \times m}.$$

Irrespective of the number of poles and of the series or parallel connection of the winding, it can be taken as the principle of order that the sum of the absolute value of the voltages at each phase alternation between adjacent coil legs in the winding head be constant and equal to the phase voltage $U_{Ph}$. Thus, taking into account the phase, the differential voltages $\Delta U$ actually occurring are between $1/\sqrt{3}\ U_N$ and $\frac{1}{2}\ U_N$, with these values as minimum and maximum values.

For all numbers of poles having no common divisor with the number of phases (such as 2p=2, 4, 8, 10, 14, 16, 20, etc. for m=3) this always makes possible winding arrangements in which the entire potential distribution scheme is repeated three or six times along the circumference in a symmetrically periodic sequence.

On the other hand, for numbers of poles 2p having a common divisor with the number of phases m (2p=6n, with n=1, 2, 3, . . . for m=3), a division of the coil group arrangement into two different part groupings must be provided, each containing a number of coils not divisable by the number of phases m and each having identical absolute initial and end potentials. These part groupings are then to be arranged m times along the circumference in direct succession. But such part groupings may also be used for the other numbers of poles.

Preferably at higher numbers of poles and with series connection of the coil groups of each phase a multiplicity of various other coil group connections may be made, if the abovementioned principle of order of the constant sum of the absolute values of the voltages at the phase alternation is waived. In these cases, too, the maximum voltage difference $\Delta U$ becomes at the most equal to the phase voltage $U_{Ph}$ at most. This makes it possible to select the location of individual coil groups in the sense of wiring connections which are easier to make in particular toward the terminal box.

DETAILED DESCRIPTION OF THE INVENTION

To facilitate understanding the invention, the following turns per slot belts, shown only for one winding layer, of the coil groups disposed along the circumference:

Provided throughout are three phase, two layer windings with Y-connected phases and the same number of "with" and "counter" coil groups having the same number of coils, in which the direction of the magnetic flux changes from coil group to coil group (conventional six zone integer slot winding). The numbers on the arrows indicating the direction of increase in potential mean the corresponding multiple of the respective coil group voltage $U_{Sg}=(a/2p)\times U_{Ph}$, a being the number of parallel branches (a=1 in a pure series connection). It suffices to give these absolute voltage values $\Delta U$ to describe the potential relations at the respective phase alternation.

Figure 2:
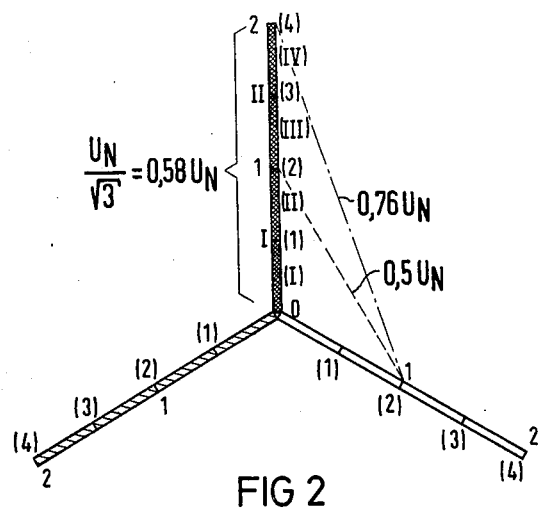
FIG. 2 is a voltage Y for a two-pole machine according to FIG. 2a with two series connected coil groups I and II per phase, and (in parentheses) for a four pole machine with four coil groups I to IV according to FIGS. 3a and 3b.
Figure 2A:
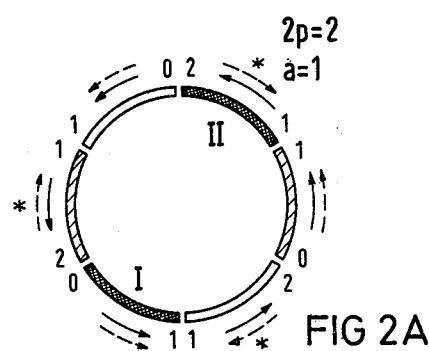
FIG. 2A shows the potential distribution of the individual "with" and "counter" coil groups of a two pole winding with series connected coil groups.

If the sum of the absolute values of the voltages in the phase transition is constant, the relationship $|U_1|+|U_2|=(2p/a)\times U_{Sg}=U_{Ph}$ applies, wherein (2p/a) is the number of the series connected coil groups per phase. The potential increases from zero at the neutral point in accordance with the stated multiple of the series connected coil groups. In addition to the arrows indicating the increase in potential, the alternating magnetic flux directions are also shown in FIG. 2A. Both arrow directions are the same for the "with" coil groups, whereas the two arrow directions oppose each other for the "counter" coil groups marked*. The magnetic flux arrows are omitted in the other Figures and the "counter" coil groups are marked*.

The coil groups associated with phase U are shown as cross-hatched, those associated with phase V as hatched and those associated with phase W are shown as black framed circular segments. Corresponding markings apply to the voltage Ys.

The sequence in which the coil groups are series connected is indicated for each phase U marked black consecutive by Roman numerals, starting at the neutral point (potential zero). The association with the various branches of parallel connections is indicated by raised additional numerals I, II, III, IV. Where parallel connections are involved, the two fundamentally different possibilities of the so called "unstable" (branches distributed symmetrically over the circumference) and "indifferent" parallel connection (branches concentrated in individual peripheral zones) are always indicated, the unstable connection being marked by the index "o".

Figure 1A:
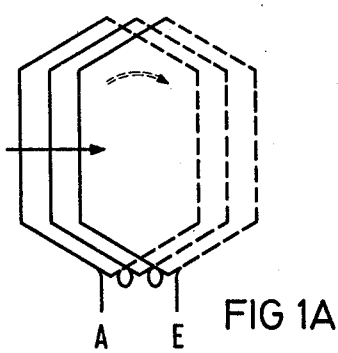
FIG. 1A shows a "with" coil group.
Figure 1B:
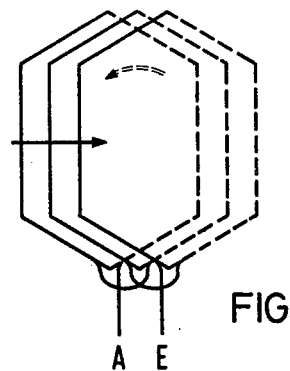
FIG. 1B shows a "counter" coil group which, with the same direction of increase in potential, generates an oppositely directed magnetic flux wherefor the start and the end are located in another slot layer than the "with" coil group.

In a "with" coil group according to FIG. 1A, the coil start A leads into the upper layer and the coil end E comes out of the lower layer; in a "counter" coil group according to FIG. 1B, on the other hand, the coil start A goes into the lower layer and the coil and E comes out of the upper layer. Therefore, in the case of FIG. 1A, the direction of the increase in potential is the same as the magnetic flux direction; by contrast, these directions are opposed to each other in the case of FIG. 1B.

Figure 2B:
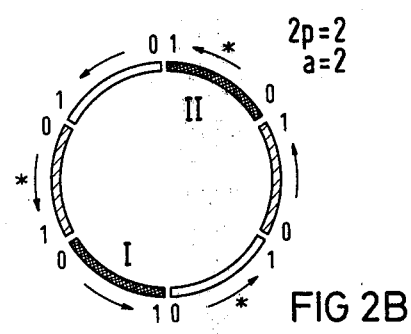
FIG. 2B is an analogous diagram for a=2 parallel winding branches per phase.

As is known, the directions of the magnetic flux in the adjacent coil groups along the circumference must alternate so that it is thus determined according to FIG. 2A where "with" or "counter" coil groups are to be provided. In the two pole windings according to FIGS. 2A and 2B, the "with" and "counter" coil groups of the various phases alternate. As is evident from FIGS. 2A and 2B the potential differences at the phase transitions are 2 to 0 (corresponding to $U_{Ph}=0.58\ U_N$) and 1 to 1 (corresponding to 0.5 $U_N$). With the conventional connection having identical coil groups throughout one would have to tolerate a considerably higher maximum and overall less uniform voltage stress with 2 to 1 (corresponding to 0.76 $U_N$) followed by 1 to 0 (corresponding to 0.29 $U_N$). The differences for a parallel connection are even more serious. According to FIG. 2B the phase voltage $U_{Ph}$ with 1 to 0 is present at the phase transitions throughout, whereas in the known connection with 1 to 1 the supply voltage $U_N$, followed by 0 to 0 (zero), is present, i.e., a maximum voltage stress higher by the factor $\sqrt{3}$.

Figure 3A:
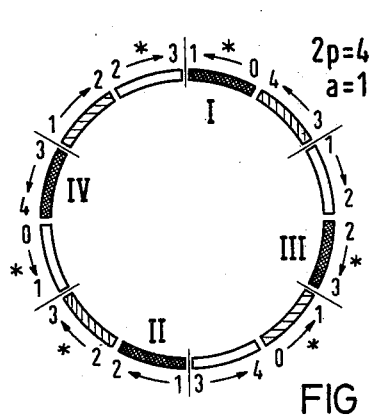
FIG. 3A shows a coil group distribution for a four pole series connected winding in which the potential distribution scheme is repeated three times.

In FIG. 3A for a four pole winding and series connection of the coil groups I to IV, two "with" and "counter" coil groups each of opposite potential increase direction from different phases come to lie next to each other alternately. The potential distribution scheme /1−0/4−3/1−2/2−3/ is repeated three times along the circumference.

Figure 3B:
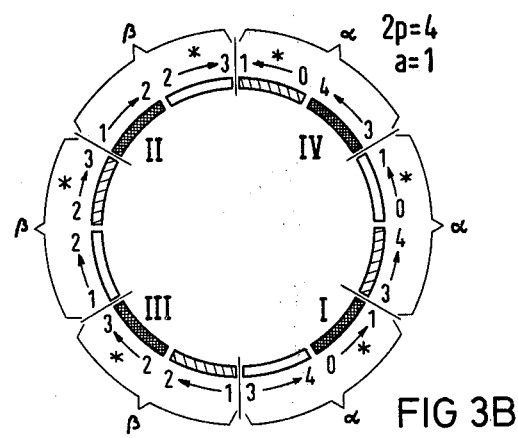
FIG. 3B illustrate a version with two part groupings, α and β, each formed of two coil groups.

In FIG. 3B a variation with two part groupings α and β of different potential distribution, obtained by cutting the complete distribution scheme present in FIG. 3A in half, is indicated. Each of these part groupings contains one "with" and one "counter" coil group, each of the same potential increase direction, and each arranged thres times in immediate succession along the circumference.

Figure 3C:
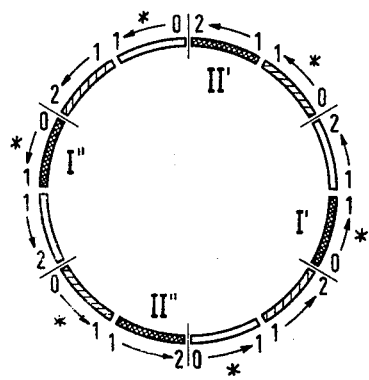
FIG. 3C shows a four pole winding with two parallel branches "indifferently" connected.

In FIG. 3C an "indifferent" parallel connection of the alternating "with" and "counter" coil groups I' and II' and I" and II" of a four pole winding in alternating succession is shown.

Figure 3D:
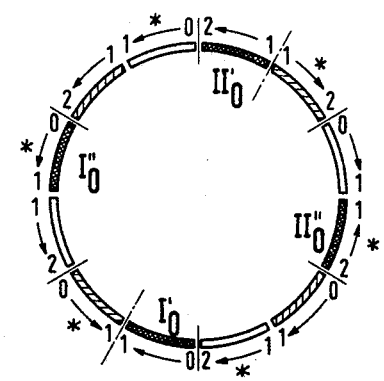
FIG. 3D illustrates four pole winding with two "unstably" connected parallel branches.

FIG. 3D shows the corresponding "unstable" parallel connection of the coil groups $I_o'$, $II_o'$ and $I_o''$, $II_o''$.

Figure 4A:
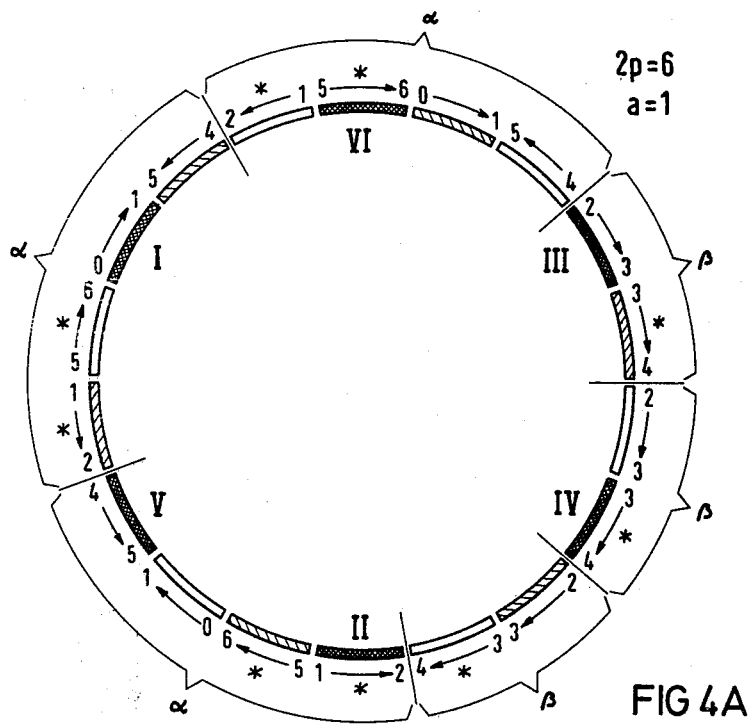
FIG. 4A a shows six pole series connected winding (a=1) with two different part groupings α and β with different numbers of coil groups.
Figure 4B:
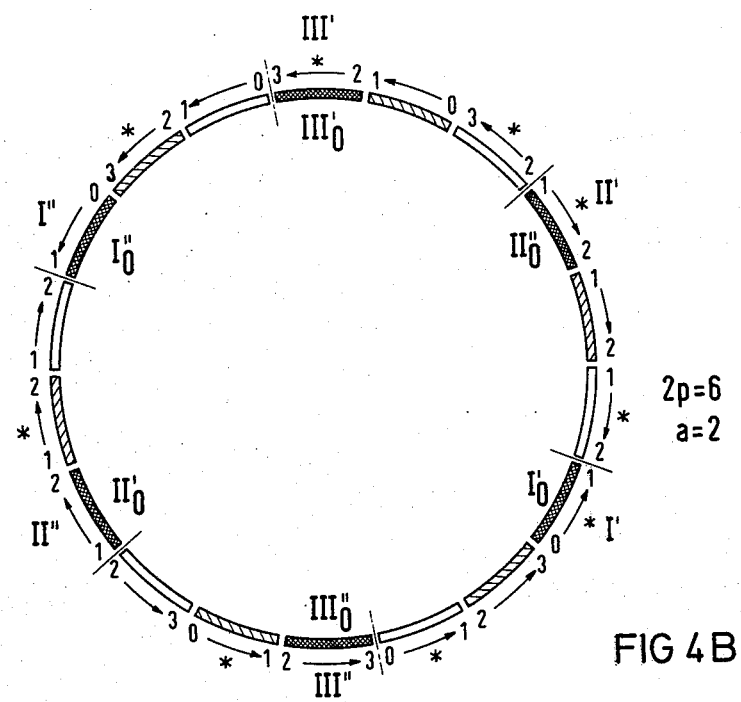
FIG. 4B shows a six pole winding with two parallel branches.
Figure 4C:
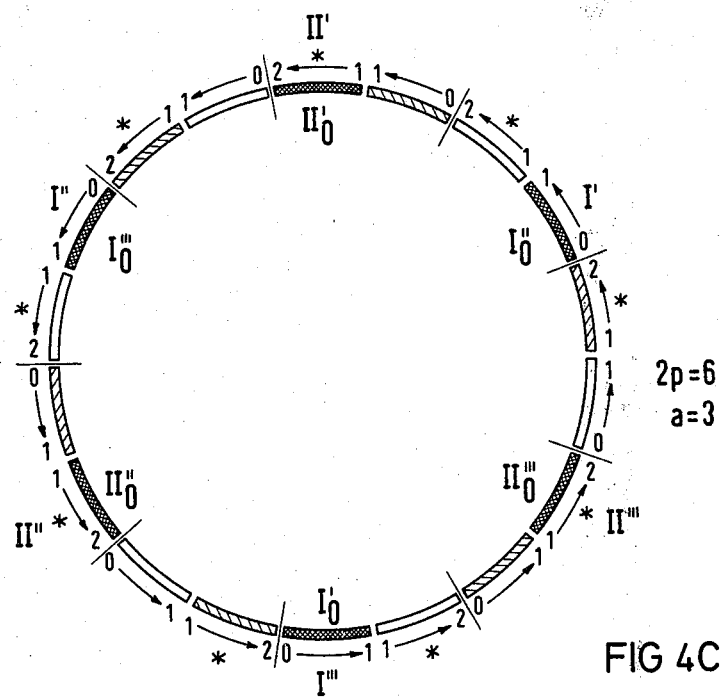
FIG. 4C shows a six pole winding with three parallel branches, the arrangement of the coil groups being marked in both cases by the Roman numerals inside the circle for "unstable" connection and by the Roman numerals outside the circle for "indifferent" connection (each for phase U)

In the six pole winding for series connection shown in FIG. 4A, the immediate three times succession of the part groupings $\alpha$ and $\beta$ with different numbers of coil groups is repeated. These part groupings are obtained by splitting the complete scheme /4−5/1−0/6−5/1−2/4−3/3−2/ into /4−5/1−0/6−5/1−2/ for $\alpha$ and /4−3/3−2/ for $\beta$, taking into consideration identical absolute values of the respective initial and end potentials. Analogously, a /1−0/6−5/ and /1−2/4−3/3−2/4−5/ split could also be made. Such divisions into two part groupings with different potential distribution are absolutely necessary in three phase windings for 6, 12, 18 etc. poles and series or parallel connection with a $\neq$3. In this connection, FIG. 4B for a connection with a =2 is noted. Each part grouping must then have a number of "with" and "counter" coil groups not divisible by the number of phases. Such measures can also be applied to windings with other numbers of poles (FIG. 3B).

Only in triple parallel connections according to FIG. 4A in "indifferent" or "unstable" distribution are such part groupings not needed because in them the complete potential distribution scheme /0−1/1−2/ comprises only two coil groups, i.e., a number not divisible by the number of phases is present.

Figure 5:
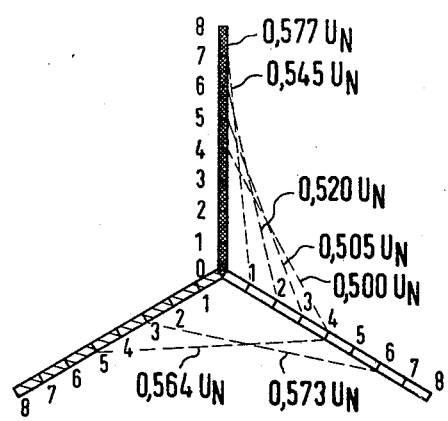
FIG. 5 is a voltage Y for an eight pole winding according to FIGS. 5a, 5b, and 5c.
Figure 5A:
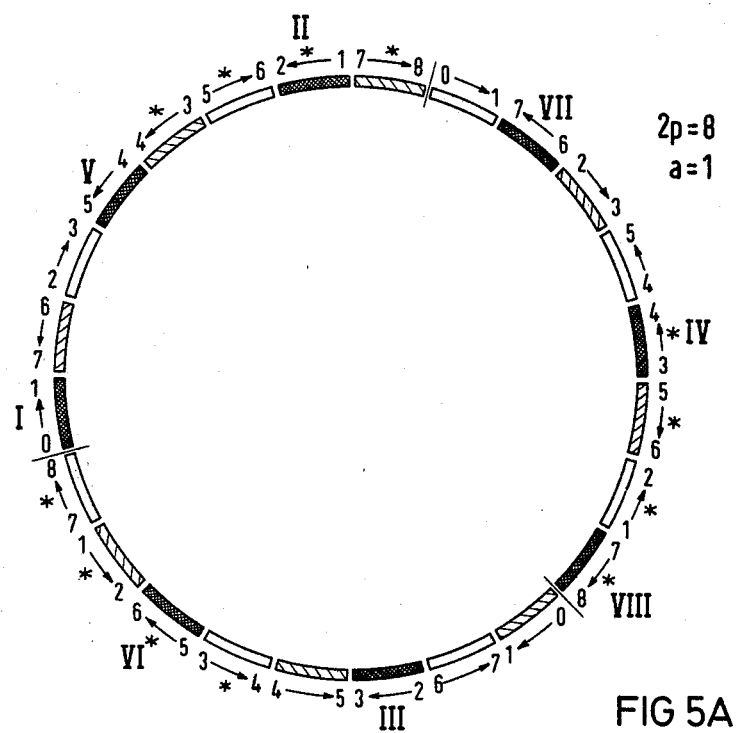
FIG. 5A shows an eight pole winding with eight series connected coil groups.

The voltage Y according to FIG. 5 shown in its right portion, for a series connection of the eight coil groups I to VIII of an eight pole winding according to FIG. 5A the individual phase voltages, adhering to the order principle that the sum of the absolute values of the coil group voltages is constant at the phase alternation. The difference voltages $\Delta U$ range from 0.5 $U_N$ at /8−0/ to 0.577 $U_N$ at /4−4/

When abandoning this order principle, it is also possible to provide in various places pairings /3+6/ or /5+4/, for instance, as indicated at the bottom of FIG. 5, where difference voltages no higher than the phase voltage$U_{Ph}$=0.577 $U_N$ are generated despite the larger absolute value sum 9 instead of the regular 8. As will not be explained more explicitly, the location of individual coil groups can be changed, such as III, IV, V, VI versus FIG. 5A, which may, in some circumstances, result in more easily made wiring connections.

Figure 5B:
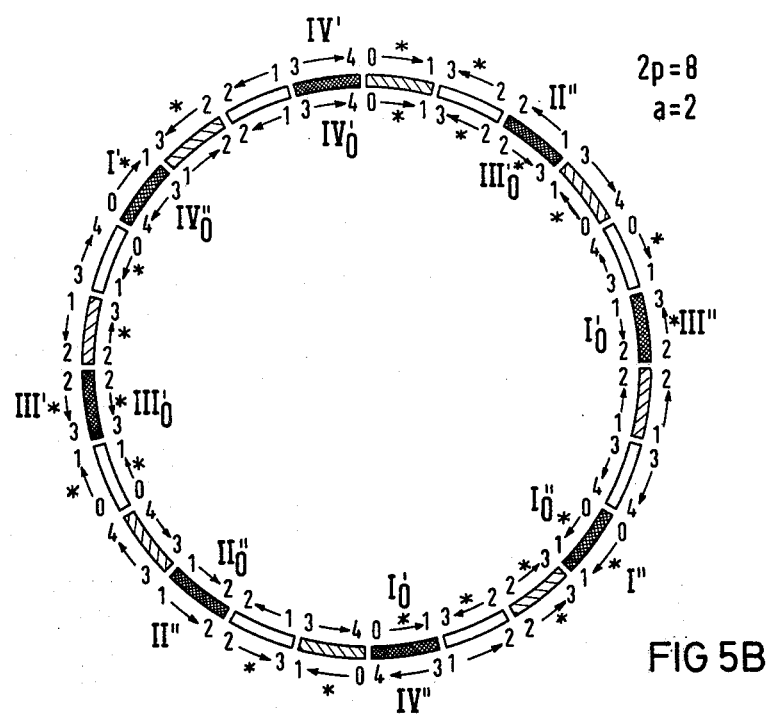
FIG. 5B illustrates an eight pole winding with two parallel branches.
Figure 5C:
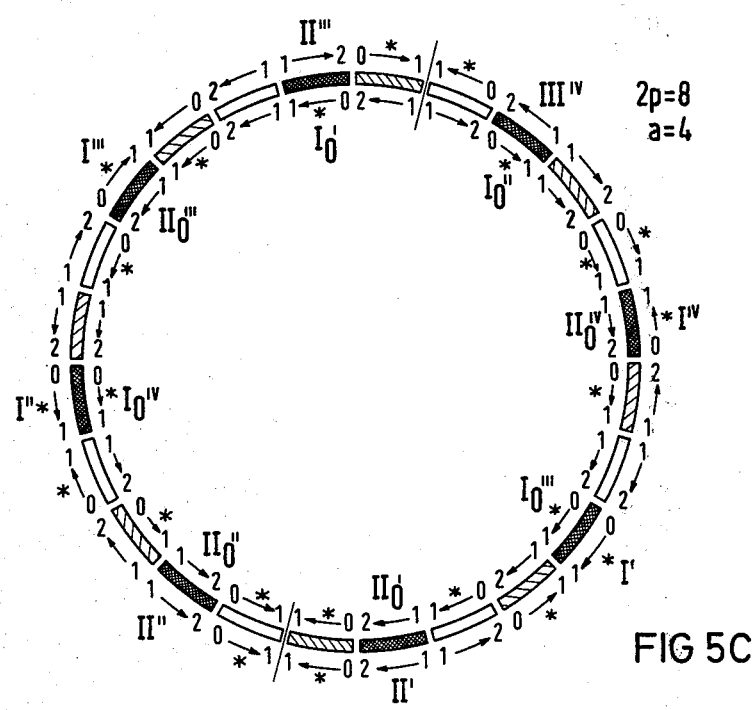
FIG. 5C shows an eight pole winding with four parallel branches, the designations inside the circle again applying to an "unstable" and those outside the circle to an "indifferent" connection.

FIG. 5B shows a double and FIG. 5C quadruple parallel connection, each in an "indifferent" or "unstable" distribution of the winding branches for eight pole windings.

Figure 6:
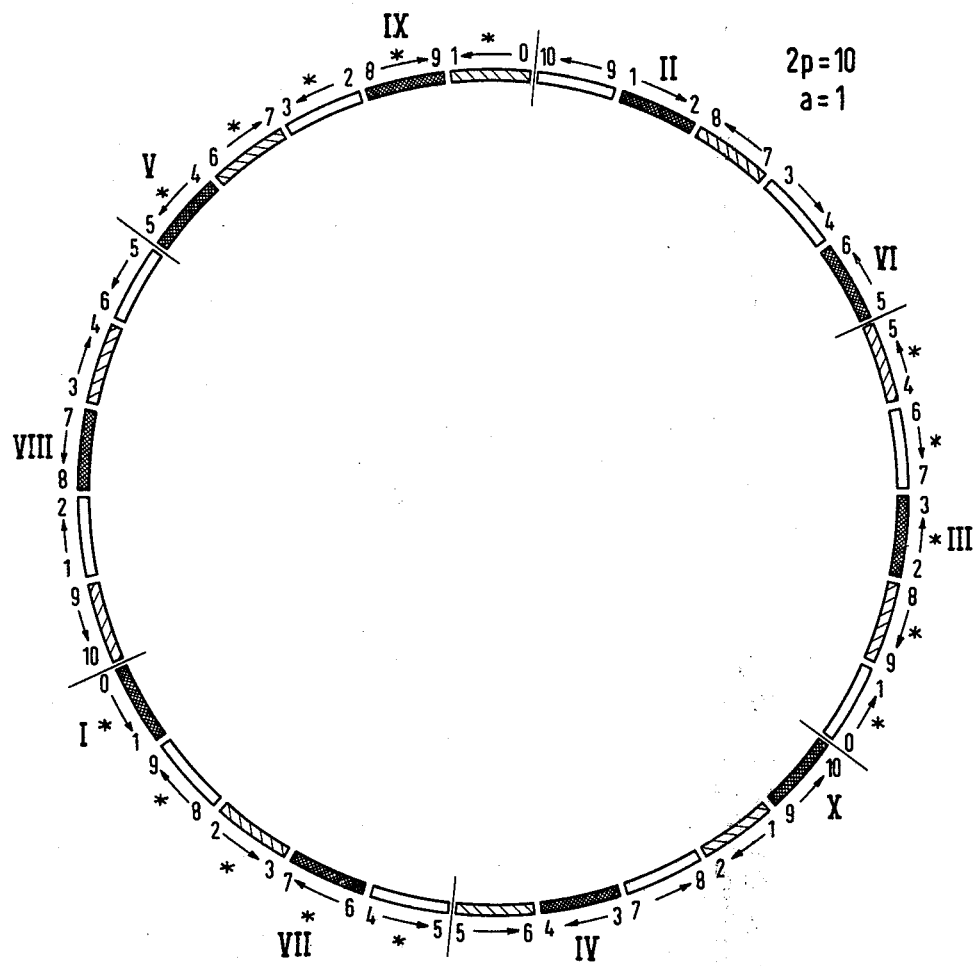
FIG. 6 illustrates a ten pole winding in series connection.

The ten pole winding in series connection shown in FIG. 6 has a triple periodicity, with five "with" and "counter" coil groups each alternating groupwise in the circumferential direction.

Figure 7:
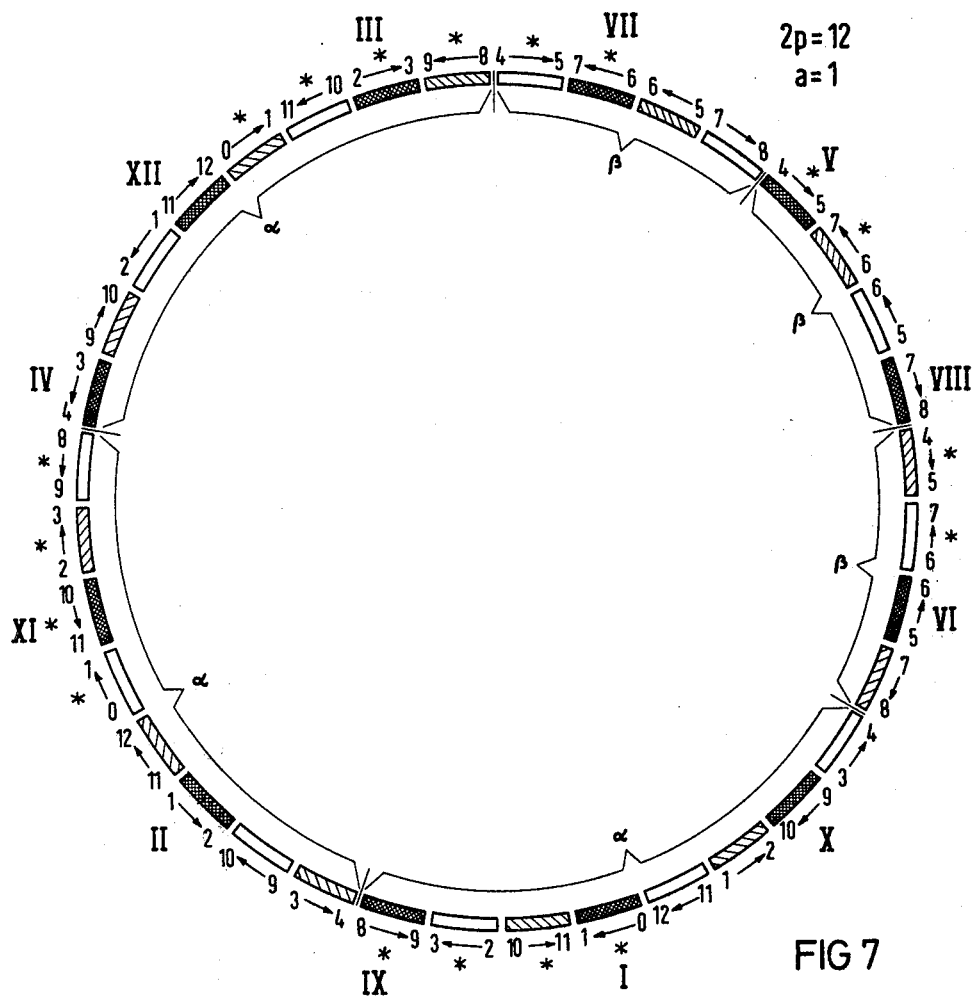
FIG. 7 shows a series connected twelve pole winding with two different part groupings α and β, disposed along the circumference three times each in immediate succession.

FIG. 7 shows a twelve pole winding in series connection with two part groupings $\alpha,\beta$ each following the other directly three times, the grouping scheme being formed by dividing the complete regular sequence /8−9/3−2/10−11/1−0/12−11/1−2/10−9/3−4/8−−7/5−6/6−7/5−4/ at the potentials 4 and 8 into two parts of four and eight coil groups. The division may also be made in the same manner at the potentials 2 and 10.

Two other variations with different part groupings, one of which extends over two and the other over ten coil groups, can also be obtained by dividing the distribution scheme at the points 2 to 10 or 11 to 1.

What is claimed is:

1. In a three phase winding for a high voltage machine with Y-connected phases whose coil groups, disposed along the circumference cyclically distributed, in slots, each consist of several series connected coils, the magnetic flux of which points alternately in opposite directions, forming at least two poles, the improvement comprising, the coils being disposed so that the magnetic flux direction in the one half of the coil groups is the same as the direction of increase in potential, these forming "with" coil groups, and the magnetic flux direction in the other half of the coil groups is opposed to the direction of increase in potential, these forming "counter" coil groups, the "with" and "counter" coil groups of the various phases being so distributed over the circumference and so interconnected phasewise that at most the phase voltage is present at the phase transitions between adjacent coil sides.

2. The improvement according to claim 1, wherein the "with" and the "counter" coil groups each have an identical number of coils $$q = \frac{N}{2p \times m},$$

in which N is the number of slots, m the number of phases, and 2p the number of poles.

3. The improvement according to claim 2, wherein the "with" and "counter" coil groups are so distributed and interconnected that the sum of the absolute values of the voltages at the phase transitions between adjacent coil sides equals the absolute value of the phase voltage.

4. The improvement according to claim 3, wherein the "with" and "counter" coil groups are distributed singly or in groups in a symmetrically periodic sequence along the circumference.

5. The improvement according to claim 4, wherein the potential distribution scheme of the absolute values of the coil group voltages, extending in the same number and sequence over "with" and "counter" coil groups of different phases is repeated at least m times, where m is the number of phases.

6. The improvement according to claim 3, wherein "with" and "counter" coil groups of different phases are combined into two part groupings differing with respect to the potential distribution scheme and each have the same absolute initial and end potentials.

7. The improvement according to claim 6, wherein the two different part groupings contain a different number of coil groups not divisible by the number of phases m.

8. The improvement according to claim 7, wherein m similar part groupings are disposed in immediate succession along the circumference.

9. The improvement according to claim 1 wherein the coil groups of the individual phases are series connected to each other.

10. The improvement according to claim 9, wherein p "with" and p "counter" coil groups, where p is the number of pole pairs, are disposed next to each other in alternating sequence.

11. The improvement according to claim 1 wherein the coil groups of the individual phases are inerconnected in simple parallel connection.

12. The improvement according to claim 11, wherein 2p/a coil groups of the parallel winding branches are disposed so as to be concentrated in individual circumferential zones where 2p is the number of poles and a is the number of parallel branches.

13. The improvement according to claim 11, wherein 2p/a coil groups of the parallel winding branches are disposed so as to be distributed symmetrically over the entire circumference where 2/p is the number of poles and a is the number of parallel branches.

* * * * *